United States Patent [19]
Dubrin

[11] Patent Number: 4,514,363
[45] Date of Patent: Apr. 30, 1985

[54] METHOD FOR ISOTOPE ENRICHMENT BY PHOTOINDUCED CHEMIIONIZATION

[75] Inventor: James W. Dubrin, Walnut Creek, Calif.

[73] Assignee: The United States of America as represented by the United States Department of Energy, Washington, D.C.

[21] Appl. No.: 302,341

[22] Filed: Sep. 15, 1981

Related U.S. Application Data

[63] Continuation of Ser. No. 150,251, May 2, 1980, abandoned, which is a continuation of Ser. No. 683,156, May 4, 1976, abandoned.

[51] Int. Cl.³ ............................................. B01D 59/00
[52] U.S. Cl. ................................... 423/3; 250/423 R; 250/423 P; 204/157.1 R
[58] Field of Search .................... 250/423 R, 423 P; 204/157; 55/17

[56] References Cited

U.S. PATENT DOCUMENTS

| | | | |
|---|---|---|---|
| 3,740,552 | 6/1973 | Pressman | 250/423 P |
| 3,772,519 | 11/1973 | Levy et al. | 250/423 P |
| 3,951,768 | 4/1976 | Gürs | 204/157.1 R |

OTHER PUBLICATIONS

Farrar, Jr. and Smith; "Photochemical Isotope Separation as Applied to Uranium"; 03/15/72, pp. 35–39.
Zavitsanos; "Chemiionization in the Oxidation of Thorium and Uranium Vapors"; *J. of Chemical Physics;* vol. 59, No. 4; 08/15/73; pp. 2162–2163.

*Primary Examiner*—Deborah L. Kyle
*Attorney, Agent, or Firm*—Shyamala Rajender; Harold M. Dixon; Judson R. Hightower

[57] ABSTRACT

Isotope enrichment, particularly $^{235}U$ enrichment, is achieved by irradiating an isotopically mixed vapor feed with radiant energy at a wavelength or wavelengths chosen to selectively excite the species containing a desired isotope to a predetermined energy level. The vapor feed if simultaneously reacted with an atomic or molecular reactant species capable of preferentially transforming the excited species into an ionic product by a chemiionization reaction. The ionic product, enriched in the desired isotope, is electrostatically or electromagnetically extracted from the reaction system.

7 Claims, 1 Drawing Figure

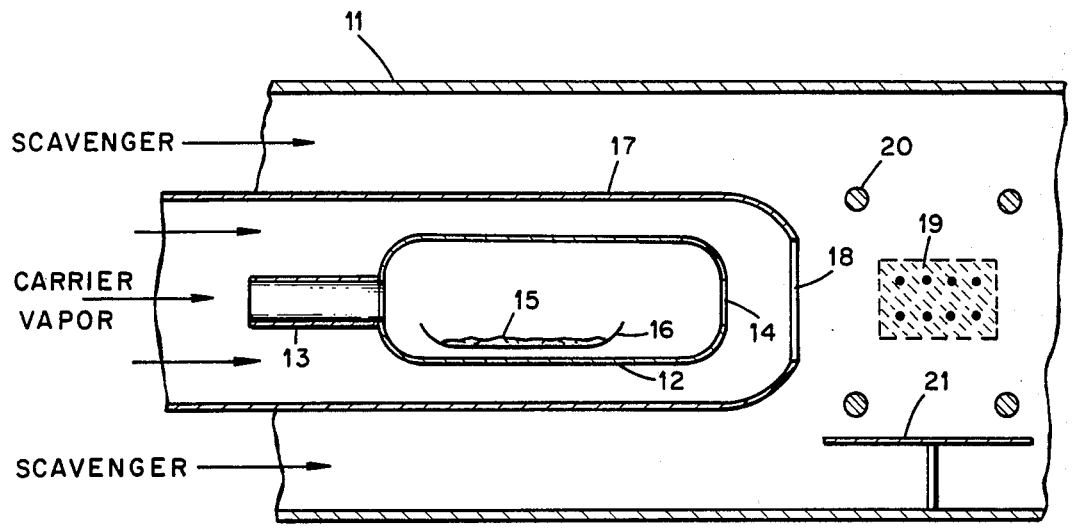

METHOD FOR ISOTOPE ENRICHMENT BY PHOTOINDUCED CHEMIIONIZATION

BACKGROUND OF THE INVENTION

The invention described herein was made in the course of, or under, Energy Research and Development Administration Contract No. W-7405-ENG-48 with the University of California.

This is a continuation of application Ser. No. 150,251, filed May 2, 1980 now abandoned, which is a continuation of application Ser. No. 683,156, filed May 4, 1976, now abandoned.

This invention relates to isotope enrichment processes, particularly to a method wherein selective excitation of a desired isotopic species is followed by a preferential chemiionization reaction to produce an ionic product enriched in the desired isotope.

Several processes for isotope separation make use of the isotope shift, that is, a slight shift of the lines in the absorption spectra of elements or molecular species due to the small difference in nuclear mass of the isotopes of the same element contained therein. When the shift places the absorption line of one isotopic species at a frequency at which the others are transparent, it is possible to excite selectively that species with a source of radiation of sufficiently narrow width.

A common feature of all separation schemes based on the isotope shift is the selective excitation of one of the isotopic species by radiation, particularly laser radiation, tuned to a specific absorption line, followed by a physical or chemical process which acts on excited species and separates them from unexcited ones. The method for realizing separation following selective excitation of an atom or molecule may or may not require the absorption of additional photons.

It has been known to separate isotopes by a one quantum step photochemical separation process, that is, irradiation of a chemical system with monochromatic radiation under a set of circumstances which will cause a preferential chemical reaction of the selectively photoexcited isotopic species with a scavenger molecule to form an isotopically enriched, stable molecular product which can be separated from the reaction system by standard physical or chemical means. Mercury, carbon, oxygen, and chlorine have been enriched in this manner and, more recently, chlorine has been laser enriched. For example, a resonance lamp with a $^{202}$Hg filling excites primarily $^{202}$Hg, and the excited atoms are then trapped by normal chemical reactions with simple molecules such as $H_2O$, $O_2$, or $HCl$, which yield stable molecular compounds. (See C. B. Moore, "The Application of Lasers to Isotope Separation", *Accounts of Chemical Research* 6, 1973, 323.) The present availability of tunable lasers extends photochemical methods to the separation of many other isotopes, notably the separation of $^{235}$U from natural uranium.

SUMMARY OF THE INVENTION

It is, therefore, among the objects of this invention to provide a new photochemical discrimination method for isotope enrichment, particularly for the enrichment of $^{235}$U in mixtures thereof with $^{238}$U.

It is a further object of the invention to provide a method for isotope enrichment by photoinduced chemiionization whereby an electrically charged (ionic) product enriched in the desired isotope is produced.

Other objects and advantages will become apparent from the following description.

The present invention is directed to an isotope enrichment process wherein an isotope source material is irradiated to selectively excite that species containing a desired isotope of an element and selective excitation is followed by a preferential chemiionization reaction with an atomic or molecular reactant species whereby the excited species are transformed into an ionic product. Separation of the ionic product enriched in the desired isotope from the reaction system is accomplished by "electrical extraction". Herein, the term "electrical extraction" is used to include electromagnetic extraction and electrostatic extraction.

The present invention is operable with an isotope source material, either an atomic or molecular species, in which an element is present in a plurality of isotopes and which is characterized by an absorption spectrum exhibiting a well-resolved isotope shift, that is, the species containing a first isotope of the element absorbs radiation at certain wavelengths (or frequencies) to a significantly higher degree than species containing a second isotope of that element. Thus, the species containing the first isotope can be excited to energy levels corresponding to such frequencies without substantially exciting the species containing the second isotope.

Selective excitation to the energy level at which it is desired to accomplish the chemiionization reaction may be achieved in a single quantum step or by a multi-quantum step operation in which the desired isotopic species is excited to the desired energy level through one or more intermediate energy levels. In a multi-step operation it is essential that the first step be isotopically selective. Successive excitation steps need not be isotopically selective but for high enrichment it is preferred that all excitation steps be selective. Selective excitation procedures for accessing a predetermined energy level are well established in the art.

The process of the present invention is particularly applicable to the separation of $^{235}$U from an isotopically mixed uranium atomic vapor containing principally $^{238}$U. The $^{235}$U atoms in the atomic vapor feed are selectively electronically excited and then transformed into an ionic product by a chemiionization reaction with an atomic or molecular reactant species YZ. Preferably, YZ is an atomic vapor scavenger and $UYZ^+$ is the ionic product formed. In certain cases, molecular scavengers YZ are reacted with the excited atom to give $U^+$, $UY^+$, $UZ^+$, or $UYZ^+$.

The invention will be better understood from the following detailed description made with reference to the accompanying drawing.

BRIEF DESCRIPTION OF THE DRAWING

The accompanying FIGURE is a schematic side view representation of a chemiionization separation unit suitable for practice of the present invention.

DETAILED DESCRIPTION OF THE INVENTION

In accordance with the present invention, an isotope source material is subjected to radiation, preferably laser radiation, at a predetermined wavelength or wavelengths to excite the species containing a desired isotope to the corresponding predetermined energy level without substantially exciting species containing undesired isotopes of the same element to the same predetermined energy level. The vapor feed is simultaneously contacted with an atomic or molecular scavenger species YZ, also in vapor form, which is capable of transforming the selectively excited species by a chemiionization reaction into an ionic product but which is substantially incapable of reacting with unexcited species under the conditions of irradiation. The resulting ionic product, enriched in the desired isotope, is electrostatically or electromagnetically extracted from the reaction system.

Preferably, the isotope source material is an atomic species, particularly isotopically mixed atomic uranium vapor wherein it is desired to separate the fissionable $^{235}U$ from the more abundant non-fissionable $^{238}U$. In most but not all cases it is also preferred that the scavenger species be an atomic species.

Herein the term "chemiionization" refers to a reaction or process that results in the formation of free charges, electrons or ions, under the conditions of chemical reactions and collisions between uncharged reactants (see F. W. Lampe, "Ionizing Collision Reactions of Electronically Excited Atoms and Molecules", Ion-Molecule Reactions, Vol. 2, Plenum Press, N.Y., 1972). In the process of the present invention, the chemiionization reaction occurs preferentially with an electronically excited isotopic species. In general, the reactions can be represented as follows wherein X* is an electronically excited species, particularly U*, and YZ represents an atom, a diatomic molecule or a polyatomic molecule, YZ being chemically different from X:

(1) $X^* + YZ \rightarrow XYZ^+ + e^-$ (Heteronuclear associative ionization)
(2) $X^* + YZ \rightarrow XY^+ + Z + e^-$ (Rearrangement ionization)
(3) $X^* + YZ \rightarrow XY^+ + Z^-$ (Rearrangement ionization with electron attachment)
(4) $X^* + YZ \rightarrow X^+ + YZ^-$ (Collisional ionization with electron attachment)
(5) $X^* + YZ \rightarrow X^+ + YZ + e^-$ (Collisional ionization)

For the present process, chemiionization reactions involving only atomic reactants, such as reactions (1) and (5) above where YZ represents an atom, are generally preferred for several reasons. First, the reaction cross section for atom-atom chemiionization processes is often very high (gas kinetic); the reaction cross section together with the laser efficiency largely define the economics of excitation. Second, atomic species are in general more stable thermochemically than most molecular species. Finally ground state reactions are much less likely in atom-atom collisions which means that a higher enrichment of the desired isotope and a lower single stage tails content can be expected.

For mechanisms (1), (4), and (5) certain simple molecular scavengers become feasible in terms of the criteria embodied in the above discussion. There are two obvious advantages of a molecular over an atomic vapor. First, the feedstock costs are generally less and secondly the generation of the atomic vapor normally requires an important expenditure of energy for the vaporization and/or dissociation of the feed. In addition, if the species X is excited to a high lying Rydberg level, the cross section for notably mechanisms (4) and (5) can be $\geq 10^{-12}$ cm$^2$ for certain molecules or nearly 1000 times greater than the gas kinetic value. The advantages of such an enormous cross section become clear in succeeding paragraphs.

Specifically for uranium isotope separation the following chemiionization reactions are suitable, U* being the selectively excited $^{235}U$ isotope:

$$U^* + R \rightarrow UR^+ + e^- \quad (6)$$

wherein R is a halogen atom, either atomic iodine, bromine, or chlorine. These can be thermally generated at acceptable temperatures from their molecular halogen gases or by an electrical discharge through the same.

$$U^* + M \rightarrow UM^+ + e \quad (7)$$

wherein M is a metal atom other than uranium, such as an alkali metal (e.g., Na), an alkaline earth metal, or a Group III metal such as thallium, aluminum and the like.

$$U^* + CO \rightarrow UCO^+ + e^- \quad (8)$$

$$U^* + NH_3 \rightarrow U^+ + NH_3 + e^- \quad (9)$$

Reactions (6) and (7) involve only atomic reactants and three body stabilization to yield a stable uncharged diatomic compound is very slow in the vapor density range required for efficient separation. With the possible exception of atomic chlorine, the ground state chemiionization with R and M atoms will be negligible. Reaction (8) is of interest because of the high thermal stability of CO and, based on experimental and thermochemical calculations, a negligible reaction rate (chemiionization and normal reaction) between CO and ground state uranium atoms. Reaction (9) is an example of a collisional chemiionization reaction in which the uranium is selectively pumped to a high lying Rydberg level (quantum number $\geq 35$). Cross sections comparable to $10^{-12}$ cm$^2$ are expected based on the large atomic radius of the Rydberg electron and the findings of related experimental studies. In particular, Rydberg states of Ar and other inert gas atoms chemiionize with this probability when collided with NH$_3$, SF$_6$ and other "attaching" gases. Based on thermochemical estimates it is believed that the ground state reaction with ammonia will be at least five orders of magnitude slower. These unusually large excited state collisional ionization cross sections coupled together with relatively long radiative lifetimes of these levels ($\geq 10^{-6}$ sec) results in far lower scavenger vapor density requirements to effectively utilize the photons. Vapor densities as low as $10-$ scavenger molecules/cc can guarantee an ionization rate much greater than the radiative decay rate. There are two major benefits realized in operating at lower scavenger pressures. First, the ion extraction becomes easier and, secondly, larger ground state cross sections can be tolerated for the same product enrichment and depleted stream tails assay.

The invention will be described in greater detail with reference to the accompanying figure which is a schematic side view representation of a chemiionization separator unit suitable for practice of the invention.

Referring to the figure, numeral 11 represents an evacuable chamber provided with suitably transparent windows for transmission of laser radiation. A cylinder-like chamber 12, provided with entry port 13 and exit slot 14, is disposed within chamber 11 in spaced relation to the walls thereof. An isotope source material 15, such as liquid uranium, in a vessel or boat 16 suitable for heating is contained within structure 12. A conduit-like structure 17 surrounds structure 12 and is spaced apart from the walls thereof. Structure 17 is provided with exit slot 18 in alignment with slot 14. Thus, three substantially distinct vapor flow regions are provided by the three structures 11, 12, and 17.

A non-interfering carrier gas, such as helium or argon, is passed through structure 12 and through the region defined by structures 12 and 17. The scavenger material, in vapor form, is passed through the region defined by structures 11 and 17. Structure 17 (optional for certain scavengers) functions to provide a buffering zone between the hot isotope source vapor and the cooler scavenger vapor. The carrier gas transports the isotope source vapor through slots 14 and 18 to a downstream region where mixing with the scavenger vapor takes place.

The resulting mixture is then irradiated in laser excitation region 19 to selectively excite the species containing the desired isotope. Generally, the laser beam is folded, or reflected, back through the region for optimum photon utilization. The selectively excited species reacts with the scavenger vapor to form an ionic product enriched in the desired isotope. The ionic product is extracted from the reaction system by means of extractor elements 20 and is collected on product collector plate 21. The enriched product is then stripped from the collector plate.

The most suitable source of radiation for practice of the invention is the optical laser. The narrow bandwidth and exact wavelength requirements for photoselective excitation require, in general, that a finely tunable laser be used. A number of linear and nonlinear phenomena are known by which the desired shifting and tuning can be effected. Suitable laser radiation sources for photoselective excitation are well established in the art.

In a particular mode of operation, atomic uranium vapor above a pool of liquid uranium (T ~ 2600°–2700° K.) is transported by a rapidly moving argon or helium vapor stream ($10^4$ cm/sec) to a downstream position where it is mixed with the scavenger stream. At the mixing point the temperatures of the uranium and scavenger streams are $<1200°$ K. and 300°–1500° K., respectively. In this region the uranium atom vapor density is typically $10^{14}$ atoms/cc while the scavenger density lies in the $10^{16}$–$10^{17}$ atoms (or molecules)/cc range, although for certain cases cited earlier significantly lower scavenger densities are employed.

Following mixing the $^{235}U$ isotope is selectively excited by tunable pulsed dye lasers all operating in the ~5500–6300 Å range. The ground state and first excited level of atomic uranium at 620 cm$^{-1}$ are selectively excited to a common intermediate energy level. Two lasers operating at different wavelengths in the indicated range are required to simultaneously access the common energy level. For processes having higher energy barriers ($>2$ eV) one or two additional visible photons pump the intermediate excited $^{235}U$ to a higher level. By employing selective multi-quantum visible excitation the $^{235}U$ can be prepared in a variety of energy states lying between ~2 eV and 6.18 eV (high lying Rydberg levels). The richness of the U atom spectra together with the tunability of the lasers enables this. The ions generated by the ensuring chemiionization reaction are electrostatically or electromagnetically extracted to the enriched product collector.

At even 1200° K. almost all of the $^{235}U$ atoms reside in the two lowest lying energy levels, the ground and 620 cm$^{-1}$ levels. Laser excited atoms which do not undergo chemiionizing reactions in a period of ~$10^{-6}$–$10^{-7}$ seconds can radiate to higher lying metastable levels (i.e., $>620$ cm$^{-1}$). However, these atoms residing in higher metastable levels will be rapidly collisionally relaxed back to the ground and 620 cm$^{-1}$ levels where they can be repumped and reacted. In this way most of the $^{235}U$ atoms can be economically stripped out of the feedstream in a single pass. Specifically, the depleted stream will have a $^{235}U$ assay of $\leq 0.2\%$ compared with the feedstream natural abundance of 0.7%. Isotopic scrambling reactions between the $^{235}U$ product ion and the neutral $^{238}U$ atomic vapor, e.g.

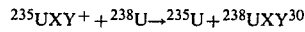

adversely affect the enrichment and, depending on the motion of the $^{235}UXY^{30}$ at the time of exchange, the otherwise extracted minor isotope would be normally lost to the depleted stream. However, as above, the $^{235}U$ atom is re-excited, chemiionized, and extracted.

Coherently pumped (e.g., copper vapor laser) dye lasers can be used for the selective excitation. A typical set of operating characteristics required are: (1) pulse width $\geq 20$ nsec; (2) pulse repetition frequency 10–20 kc; spectral width ~ 1 GHz; (4) average power 5–30 W; and (5) overall electrical efficiency $\geq 0.1\%$.

The laser beams are passed along the length ($\geq 2$ meters) of the uranium vapor flow. The illuminated cross-sectional area is typically 5–10 cm$^2$ in order to ionize and collect most of the $^{235}U$ atoms. Normally, the laser beams are folded back to optimize the photon utilization. Collisonal relaxation of high lying metastables occurs in a distance small ($\leq 0.1$ cm) compared to the dimensions of the irradiated region.

The throughput of the separation unit illustrated is approximately $10^4$ separative work units (SWU)/yr. The collected product enrichment is governed by ionic isotopic scrambling events in the gas phase and minor contamination of the $^{235}U$ collector with neutral $^{238}U$ vapor. The typical single pass enrichment is 15% $^{235}U$ with $\leq 0.2\%$ tails.

The separation of $^{235}U$ from an isotopically mixed atomic uranium vapor in accordance with the process of the present invention is described in the following example.

EXAMPLE

An atomic uranium vapor consisting essentially of neutral atoms of $^{235}U$ and of other isotopes of uranium, principally $^{238}U$, is suitably generated in a resistively heated tungsten oven loaded with the uranium alloy, URe$_2$. The vapor source, which is described in greater detail in the copending application of Oscar H. Krikorian, Ser. No. 462,016, filed Apr. 16, 1974, for "Method for Producing Uranium Atomic Beam Source", is operated at a temperature of at least 2150° K. in order to provide an atomic beam having a sufficiently high uranium vapor density for effective isotope separation.

The atomic vapor is formed into a collimated beam by passage through a collimating slit. Two overlapping pulsed dye laser beams operating at frequencies of ~6056 Å and ~6031 Å are directed through the uranium vapor to electronically excite the $^{235}U$ atoms without substantially exciting the $^{238}U$ atoms. Simultaneously, an iodine atom vapor beam is directed into the excitation region, the iodine to uranium mole ratio being approximately 100. The iodine vapor reacts preferentially with the excited species in accordance with the following chemiionization reaction:

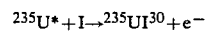

The unexcited $^{238}$U atoms remain substantially unreacted and neutral. The ionic product enriched in $^{235}$U is collected on a negatively charged collection plate maintained at $-1500$ volts. In addition, a mass spectrometer is used to continuously monitor the isotopic assay of the ions.

The separation process is conducted in a high vaccum of about $10^{-6}$ torr. The typical average laser powers required for this demonstration are approximately 0.1 Watt. Enrichment factor for a single theoretical stage is of the order of 300 to 500.

There are a number of advantages of the described chemiionization process over other uranium laser isotope separation techniques, in paraticular certain photodissociation and photoionization methods. The absence of the problem of low absorption cross sections (photoionization and photodissociation) results in a significant improvement in the photon economics. The lower average laser powers required simplify the optics and improve system reliability. Most of the $^{235}$U can be stripped out of the feed in a single pass thereby eliminating the need for staging. In a number of instances a single quantum process can be realized thereby reducing the number of lasers, effecting a further improvement in the photon economics and eliminating the need for multi-beam optics. The technique employs lasers of modest average powers and for which a present technology exists. Finally, in the presence of an electron attaching scavenger the ionic extaction can be facilitated.

While a specific example and operational sequence for carrying out the invention have been described, modifications and changes will become apparent to those skilled in the art, and it is intended to cover in the appended claims all such modifications and changes as come within the spirit and scope of the invention.

What I claim is:

1. A method for isotope enrichment wherein the isotope source is an atomic vapor of uranium present in a plurality of isotopes, said atomic vapor being characterized by an absorption spectrum exhibiting a significant isotope shift such that there exists a frequency at which irradiation of said vapor excites atoms of a first isotope of the element without substantially exciting atoms of a second isotope of the element, which method comprises:
   a. providing a vapor phase mixture of said atomic vapor and a reactant species capable of transforming excited atoms of said element into an ionic product by a chemiionization reaction without substantial reaction with unexcited atoms of said element under the conditions of said irradiation, said reactant species being selected from the group consisting of a halogen, an alkali metal atom, an alkaline earth metal atom, a Group III metal, CO and $NH_3$;
   b. subjecting said vapor phase mixture to irradiation at said frequency, thereby exciting atoms of said first isotope without substantially exciting atoms of said second isotope and transforming the excited atoms into an ionic product enriched in said first isotope by said chemiionization reaction without substantial transformation of the unexcited atoms into an ionic product; and
   c. electrically extracting the resulting ionic product enriched in said first isotope from the vapor mixture.

2. A method according to claim 1 wherein said halogen is iodine.

3. A method according to claim 1 wherein said alkali metal is sodium.

4. A method according to claim 1 wherein said Group III metal is thallium or aluminum.

5. A method according to claim 1, wherein said reactant species is CO.

6. A method according to claim 1 wherein said reactant species is $NH_3$.

7. A method according to claim 1 wherein said plurality of isotopes includes $^{235}$U and $^{238}$U.

* * * * *